Sept. 5, 1933. L. DEL RICCIO 1,925,524
MECHANISM FOR THE AUTOMATIC FOCUSING OF CAMERAS
Filed July 22, 1931 4 Sheets-Sheet 2
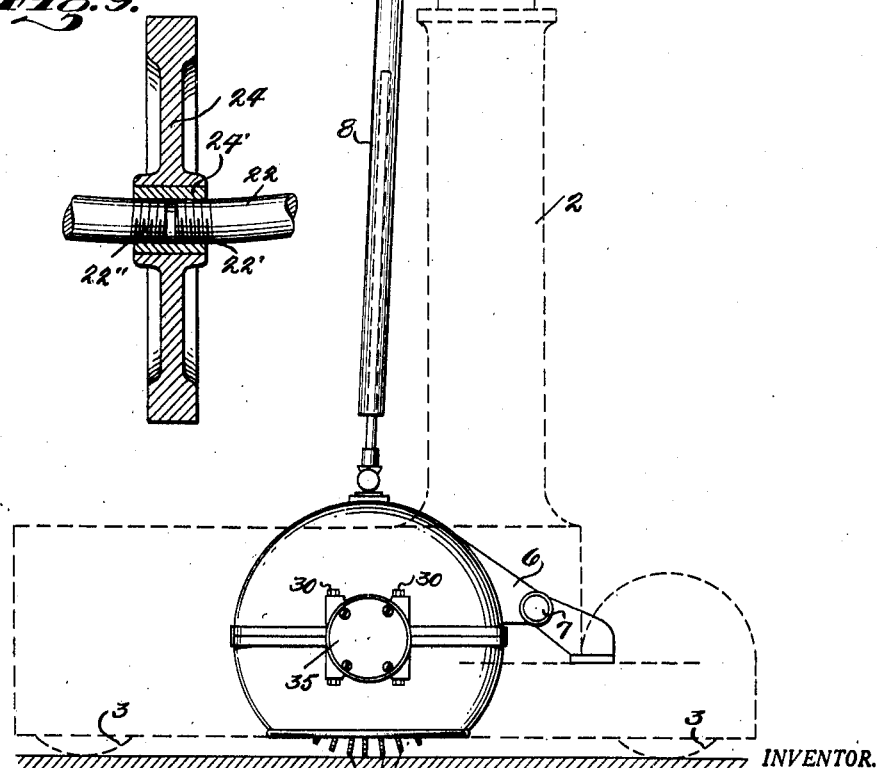

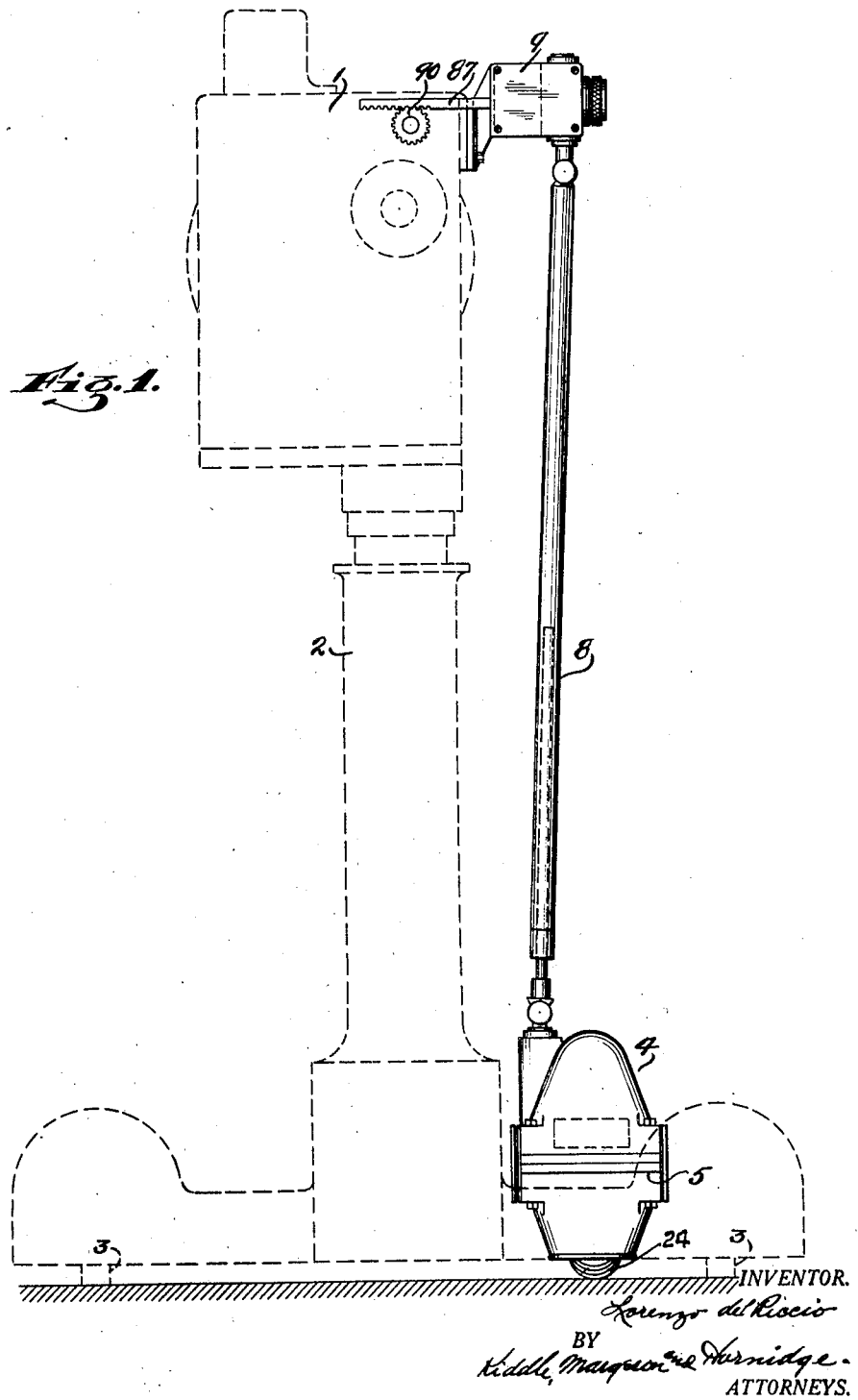

Sept. 5, 1933.    L. DEL RICCIO    1,925,524
MECHANISM FOR THE AUTOMATIC FOCUSING OF CAMERAS
Filed July 22, 1931    4 Sheets-Sheet 3
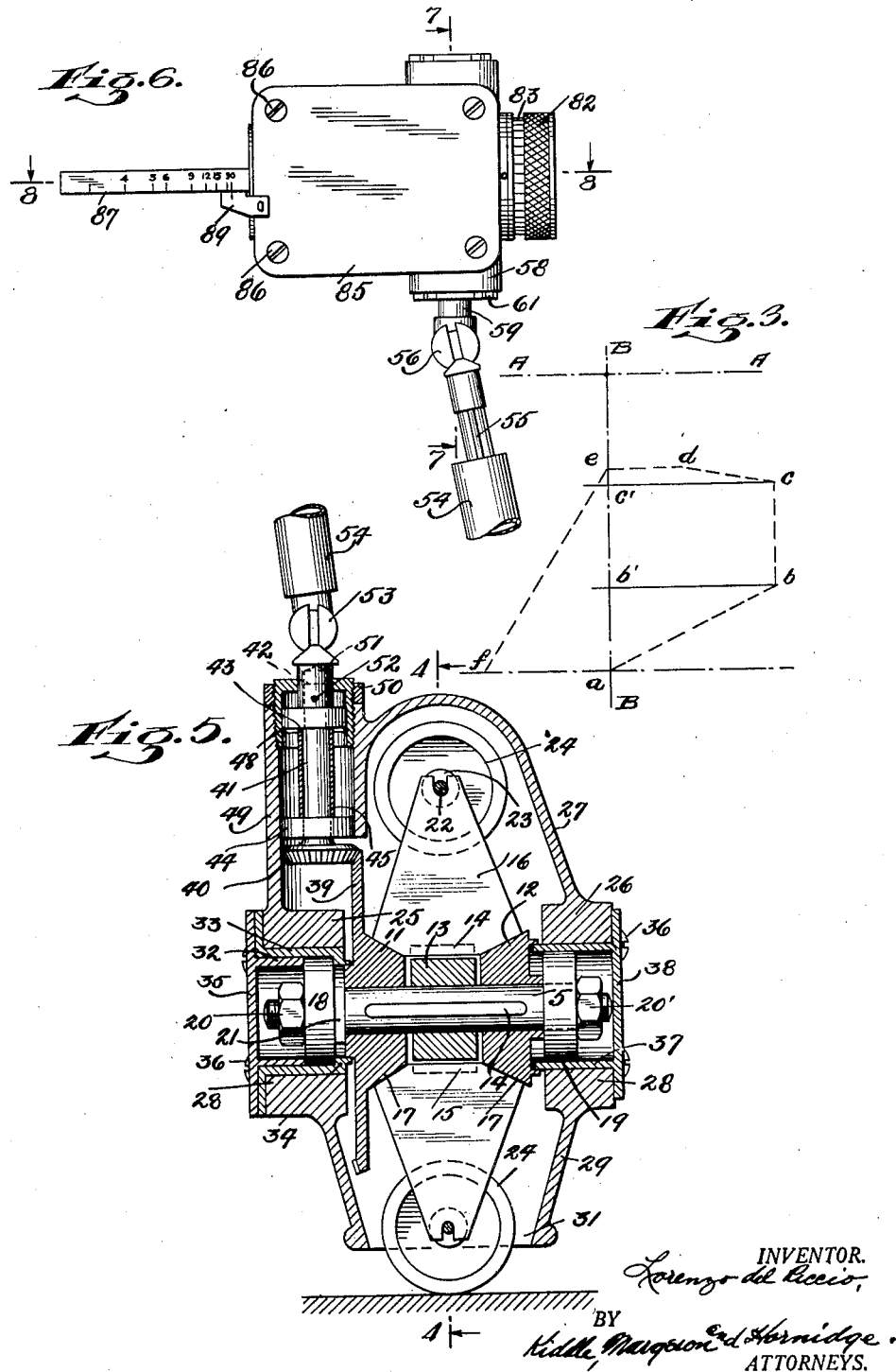

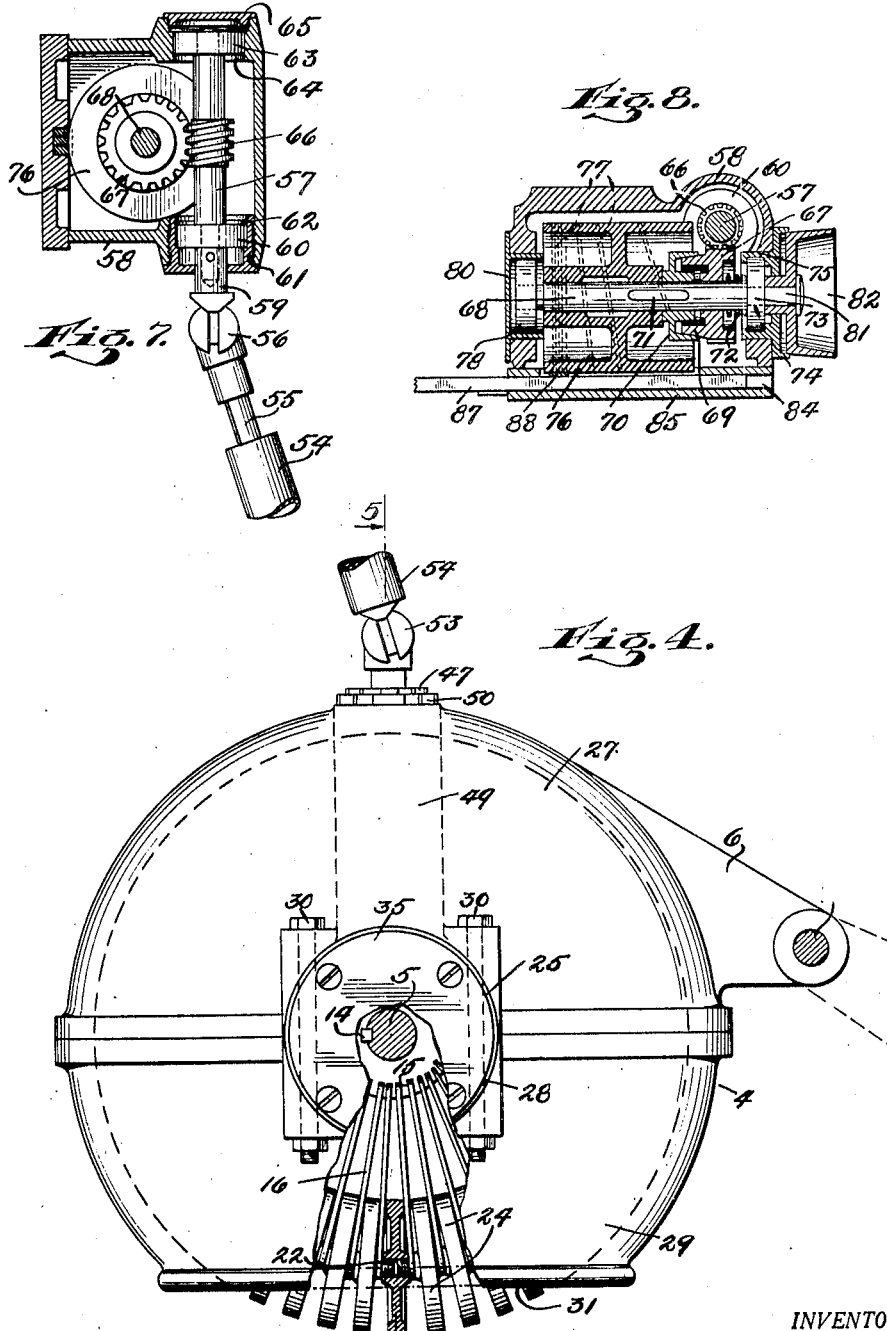

Patented Sept. 5, 1933

1,925,524

UNITED STATES PATENT OFFICE 1,925,524

MECHANISM FOR THE AUTOMATIC FOCUSING OF CAMERAS

Lorenzo del Riccio, New York, N. Y., assignor to Paramount Publix Corporation, New York, N. Y., a corporation of New York Application July 22, 1931, Serial No. 552,307, and in France August 6, 1930

9 Claims. (Cl. 95—45)

In the course of taking motion pictures it is often necessary to move the apparatus or camera for taking the pictures closer to or further away from the plane of the subjects and heretofore it has been necessary after such movement of the camera to focus the camera lens by hand.

According to the present invention I provide for automatically focusing the lens system of the camera, this automatic focusing means taking the form of a support for the camera provided with rotatable means so constructed and arranged and so connected to the lens system of the camera that on each movement of the camera with respect to the subject being photographed, assuming that the distance from the camera to the subject to be varied, the lens system of the camera will be automatically moved so as to maintain the subject in focus.

More specifically the present invention provides a rolling support for the camera supplied with a planimetric wheel rotatable in a vertical plane about a horizontal axis. This wheel only rotates to the extent that the camera moves towards or away from the plane of the subject or subjects being photographed whether this displacement be perpendicular to the plane of the subject or oblique. In other words, it is only the component of the displacement of the camera perpendicular to the plane of the subjects which effects rotation of the wheel, while the component which is parallel to said plane causes the wheel to slip. The angular position of the wheel and the number of times it rotates from an original position, as will be brought out hereinafter, therefore, only depends on the distance of the camera from the plane of the subject and to each such distances requiring a definite focus there will be a corresponding definite angular position of the wheel. A suitable transmission is interposed between this wheel and the lens system and by suitably designing this transmission any variation of the distance of the camera from the plane of the subject due to displacement of the camera will automatically produce by rotation of the planimetric wheel corresponding focusing of the camera lens system.

The present invention provides also a planimetric wheel as above referred to the rim of which contacts with the ground and comprises a number of rollers loosely mounted on spindles parallel to the spindle or axis of the wheel. In this manner the axial component of the displacement of the planimetric wheel causes the wheel to roll on the rollers of the rim instead of causing the wheel to slip as with a fixed rim which would of course produce objectionable vibrations of the camera.

As will be brought out hereinafter the diameter of the planimetric wheel is adjustable, the axes of the rollers being mounted on the spokes of the planimetric wheel, these spokes having oblique sides and cooperating with a two-part conical hub so that the spokes may be moved inwardly or outwardly with respect to the hub of the wheel, thereby varying the effective length of the spokes with a consequent variation in the diameter of the wheel as a whole.

The rollers may be mounted on a common spindle which conveniently comprises a flexible or extensible resilient rod supported by the spokes of the planimetric wheel. The spindle or axis of the wheel itself is preferably mounted on a lever which is hinged on a horizontal pin secured to the support of the camera substantially at the height of the spindle of the wheel.

The transmission between the planimetric wheel and the lens system of the camera comprises transmission gearing and a telescopic shaft having universal joints at each end, one end of this shaft, as will be understood, being connected to the transmission and the other end to the mechanism for actuating the lens system.

The lens system is focused by longitudinal displacement of a rod, this rod being provided with a finger engaged in a spiral groove having a variable pitch made in the surface of a drum and driven through the instrumentality of gears or a worm and gear system by a shaft mounted on the camera and connected to one end of the telescopic shaft above referred to.

Means are provided whereby the camera may be focused by hand in the usual fashion without, however, disconnecting the automatic focusing mechanism.

In the accompanying drawings:

Figs. 1 and 2 are, respectively, a front and side view of my improved device showing a camera and a stand therefor with my device applied thereto;

Fig. 3 is a diagram illustrating the theory of operation of the apparatus;

Fig. 4 is a side view partly in section of the planimetric wheel, this view being taken along the line 4—4 of Fig. 5;

Fig. 5 is a section on the line 5—5 of Fig. 4;

Fig. 6 is a side elevational view of part of the transmission mechanism;

Fig. 7 is a section on the line 7—7 of Fig. 6;

Fig. 8 is a section along the line 8—8 of Fig. 6; and

Fig. 9 is a detail.

Referring to the drawings in detail and first of all to Figs. 1 and 2, it will be seen that the apparatus, as illustrated, includes in general a camera 1 mounted on a stand 2, this stand being provided with rollers 3 to enable the same to be readily moved over the surface of the ground.

4 designates a planimetric wheel provided with a horizontal spindle 5 carried by a lever 6 adapted to rock about a pivot 7 with which the base 2 is provided. The planimetric wheel, as will be seen from the drawing, rotates in a vertical plane and this rotation is transmitted to the camera lens system through the instrumentality of a telescopic shaft 8 and a transmission mechanism 9 shown in Figs. 1, 6, 7 and 8 to produce automatic focusing of the lens.

The planimetric wheel 4 is shown in detail in Figs. 4, 5 and 9 and as will be seen by reference to these figures comprises a hub made up of two conical parts 11 and 12, and a central cylindrical part 13 all slidably mounted on the spindle 5 above referred to. These parts are prevented from rotating on this spindle by a key 14.

The central cylindrical part 13 of the hub is provided with grooves 15 and these grooves are adapted for receiving the inner end of each of a plurality of flat spokes 16 for the wheel. These spokes are cut obliquely at their inner ends at each side of the portion received by the grooves 15 aforesaid. The oblique surfaces 17 thus provided bear on the conical surface of the cones 11 and 12. These cones 11 and 12 are mounted between two anti-friction bearings 18 and 19 and held in place by means of nuts 20 and 20' which are screwed on the tapped ends of the wheel spindle 5. A shoulder 21 on the spindle is interposed between the cone 11 of the hub and the anti-friction bearing 18.

The spokes 16 of the planimetric wheel are encircled by a circular ring or spindle 22, the spokes being notched as at 23 to receive this spindle. The spindle or shaft 22 functions to complete the mounting of the spokes 16 which in the construction shown, as above described, are not assembled positively to the hub. The spindle or ring 22 can be enlarged by adjusting the nut 20 so as to move the cones 11 and 12 of the hub of the wheel 4 closer together, thereby forcing the spokes 16 of the wheel outwardly by reason of the engagement of the oblique faces 17 of the spokes with the cones.

Rollers 24 are interposed between the spokes 16 of the planimetric wheel, these rollers being mounted on the spindle or ring 22 and as will be seen from Fig. 5 form as a whole a rim for the planimetric wheel, these rollers being rotatable in a direction transverse of the wheel 4.

The circular ring or spindle 22 may be conveniently composed of a bent metal wire the adjacent ends of which are oppositely threaded, said ends 22' and 22" being received by a nut 24' having a double thread, see Fig. 9, which forms a bearing for one of the rollers 24 which is placed at the junction of the wire ends. This arrangement besides permitting of the mounting of the spindle 22 permits the circumference of the spindle to be adjusted as above described. The other rollers 24 may simply rotate on sleeves and pass over the spindle.

It will be appreciated that when a lateral movement is imparted to the wheel 4 in moving the camera base 2 the wheel will roll freely on the rollers 24 without slipping and without rotating on its spindle 5. This is also true for the transverse component of an oblique movement of the base 2. The tangential component (for example the component ab' of the displacement ab on the diagram of Fig. 3) and which determines the variation of the distance of the camera from the plane of the subject being photographed will produce a proportional rotation of the wheel.

The lever 6 which mounts the wheel 4 as aforesaid and is pivoted on the base 2 is secured to the upper halves 25, 26 and 27 of the bearings for the anti-friction bearings 18 and 19 and of the housing of the planimetric wheel, the lower halves of the bearings and housing 28 and 29 being formed by a part assembled to the bearing and housing members 26 and 27 by means of bolts 30. The lower portion 29 of the housing for the wheel has an opening 31 therein so as to permit the rollers 24 to contact with the ground.

32 and 33 designate two tubular members or sleeves fitting into or telescoping each other and received by the bearing members 25 and 26. The tubular member or sleeve 33 is provided with an inwardly extending flange 34 and the bearing 18, the periphery of which bears on the inner surface of the sleeve 33, is thus held in a definite axial position between the flange 34 and the end of the inner sleeve or tube 32. This sleeve 32 is closed at its outer end so as to provide a cover 35 for the bearing and is secured to the sleeve 33 and to the bearing members 25 and 28 by screws 36. The bearing members 26 and 28 are provided with a sleeve 37 permitting an axial movement of the anti-friction bearing 19, this sleeve 37 being similar to the sleeve 32 in that it is closed at its outer end to form a cover 38 and is secured in place by screws 36.

The cone 11 of the hub of the planimetric wheel 4 is provided with a toothed ring 39 which meshes with a bevelled pinion 40 keyed on a spindle 41, the threaded end 42 of reduced diameter of which forms a shoulder 43 at its junction with the main part of the spindle. On the spindle 41 are mounted an anti-friction bearing 44, a cross piece 45 and an anti-friction bearing 46, the latter being forced on to a sleeve 47 and keyed by means of a resilient ring 48 lodged in a groove in the sleeve. The sleeve 47 is screwed into a barrel 49 integral with the casing member or housing 27, this barrel also guiding the bearing 44. A lock nut 50 enables the assembly of the sleeve 47 with the barrel 49 to be locked. A cap 51 screwed on to the threaded end 42 of the spindle 41 and held by a pin 52 forms the first member of a universal joint 53 which connects the spindle 41 to a hollow shaft 54.

This shaft receives a shaft 55 which is slidable therein but is prevented from rotating relatively thereto, the assembly 54—55 thereby forming a telescopic shaft of variable length. As will be appreciated from an inspection of Figs. 1 and 2 the telescopic shaft formed by the members 54 and 55 enables the height of the camera 1 to be varied on its support 2.

The shaft 55 is provided with a second universal joint 56 and through this joint is adapted to drive a transmission mounted on the camera, this transmission being shown in Figs. 6, 7 and 8.

It will be seen from an inspection of Fig. 7, for instance, that this transmission comprises a shaft 57 mounted in a housing or box 58 in a manner similar to the mounting of the spindle 41, by means of a cap 59, anti-friction bearing 60, sleeve 61, resilient ring 62 and anti-friction bearing 63 engaged in a bore 64 of the housing, the housing being closed by a screwed lid 65.

Mounted on the shaft 57 is a worm 66 meshing with a worm wheel 67 which is loosely mounted on a shaft 68. The worm wheel 67 is flanged at 69, this flanged portion forming the male part of a friction coupling, the female part 70 of which is keyed to the shaft 68 by a key 71. The worm gear 67 is pressed against the sleeve 70 by a spring 72 carried by the shaft 68, this spring bearing on anti-friction bearing 73 mounted on a part 74 of the shaft 68 and lying in a case 75 screwed in the housing 68.

A drum 76 is also keyed on the shaft 68 adjacent the coupling or clutch member 70 and is provided on its periphery with a helicoidal groove 77 of variable pitch. The mounting of the shaft 68 in the housing 58 is completed by an anti-friction bearing 78, a shoulder 79 of the shaft 68 interposed between the latter and the hub of the drum 76 and a sleeve cover 80 screwed in the housing 68 and which is engaged by the bearing 78.

The other end 81 of the shaft 68 is squared and carries a milled knob 82 the periphery of which is provided with a scale 83. This knob permits of the shaft 68 and drum 76 being rotated by hand. The friction coupling above referred to, the action of which is determined by the spring 72, is provided so that the effort required by the drum 76 and the members controlling the lens which are actuated by said drum can be transmitted and so that the coupling will yield to a much smaller effort than will be required for driving the transmission members connected to the planimetric wheel through the shaft 68 and which if rotated when the knob 82 is turned will make the whole apparatus roll on the ground. Consequently by manipulating the milled knob 82 the focusing of the lens can be done by hand by varying it a distance corresponding to a movement of the subject the planimetric wheel and the whole of the apparatus remaining stationary and the distance being read on the scale of the knob. This permits of the camera being properly focused initially as will be understood.

In a groove 84 provided in the cover 85 of the housing 58, this cover being secured in place by screws 86, is a slidable rod 87 which is adapted to control the focusing of the lens system of the camera. This rod is provided with a nipple 88 in engagement with the helicoidal groove 77 cut in the face of the drum 76 so that rotation of the drum will cause a longitudinal movement of the rod. The rod 87 has a scale on which can be read, by means of a mark traced on a finger 89 fixed to the cover 85, the focal distance corresponding to each position of the rod. It is known that a scale of this kind becomes progressively smaller, that is to say, the displacement of the rod controlling the lens is not proportional to the focal distance but follows a definite law which is a function of said distance. The transformation of the rotation of the drum 76 which is proportional to the variation in the distance of the camera from the plane of the subjects into a non-proportional displacement of the rod 87 is obtained by means of the shape of the groove 77 which can be generated on the drum in any desired manner so as to obtain the correct movement of the rod according to the known law controlling the focusing of any lens system which is to be used in the camera.

The rod 87 is provided with rack teeth meshing with a toothed pinion 90 which actuates in any desired manner the lens system of the camera. I have deemed it unnecessary to show the actual connection of the pinion 90 with the lens system as such connection may take a great number of forms as will be appreciated by those skilled in this art.

It will be seen from all of the foregoing that any movement of the camera base 2 with respect to the plane of a subject being photographed will effect through the planimetric wheel 4 and the transmission mechanism of Fig. 8 along with the drive shaft 8, provided this movement of the camera varies the distance of the camera from the plane of the subject, the proper amount of movement of the lens system of the camera as determined by the helicoidal groove 77 in the drum 76 to maintain the camera properly focused.

It will be appreciated furthermore that on any movement of the camera with respect to the plane of the subject, whereby the distance between the camera and the plane of the subject being photographed is not varied, the setting of the lens system of the camera will not be altered.

Referring to the diagram in Fig. 3. In this figure the line A—A represents the plane of the subject. The broken line $a$—$b$—$c$—$d$—$e$—$f$ represents by way of example a number of successive displacements of the camera with respect to the plane of the subject. The line B—B is perpendicular to the plane A—A and enables the variations in the distance of the camera produced when the camera is moved from one point to another to be projected on to the planes of the subject. When the camera moves from $a$ to $b$ the planimetric wheel 4 will, as will be appreciated, rotate through an angle proportional to the projection $ab'$ of $ab$ on the perpendicular BB. When the camera successively reaches the points $c$, $d$, $e$ and $f$ the number of revolutions of the wheel 4 each time will be proportional to the projections $b'c'$, $c'e$ and $ea$ of the segments $bc$, $cd$, $de$, $ef$. Consequently the wheel 4 always rotates proportionately to the variation in the distance of the camera from the plane of the subjects and independently of the distance actually traveled and will take consequently a definite position each time the camera is at a certain distance from the plane of the subjects. As the planimetric wheel 4 is connected to the lens system of the camera, at each position of the wheel there will be a corresponding movement of the lens system and an entirely automatic and perfect focusing of the camera can be obtained.

In practice should it be desired to change the lens system to a system of different focal length it will be appreciated that this change will necessitate no alteration in the apparatus except the generation of a different helicoidal groove 77.

It will be appreciated that changes may be made in the details of my construction above described within the purview of this invention.

What I claim is:—

1. In combination a camera, a support therefor, and means carried by said support and connected to the lens system of the camera for automatically focusing the camera as the camera and the support for the same are moved in any direction which varies the distance between the camera and the plane of a subject to be photographed.

2. In combination a camera, a support therefor, and a wheel connected to the lens system of the camera and carried by said support for automatically focusing the camera as the camera and the support for the camera are moved along the ground in a direction to vary the distance between the camera and the plane of a subject to be photographed.

3. In combination a camera, a support therefor, and rotatable means carried by said support and connected to the lens system of the camera for automatically focusing the camera as said camera and the support are moved in any direction which varies the distance between the plane of a subject to be photographed and the camera.

4. In combination a camera, a support therefor, a rotatable element carried by said support, and means including a gear train intermediate the said rotatable element and the lens system of the camera for automatically focusing the camera as said camera and the support are shifted in moving the camera in any direction which varies the distance between the camera and a subject to be photographed.

5. In combination a camera, a support therefor, a wheel carried by said support and rotating about a horizontal axis, and means including a gear train adapted to be attached to the lens system of the camera, rotation of said wheel due to movement of the camera and its support in any direction which varies the distance between the camera and the plane of a subject to be photographed automatically effecting focusing of the camera.

6. In combination a camera, a support therefor, a wheel carried by said support and rotated on movement of the camera and its support in any direction which varies the distance between the camera and the plane of a subject to be photographed, rollers carried at the periphery of said wheel and rotatable about axes at right angles to the axis of rotation of said wheel, and means including gearing driven by said wheel and a telescopic shaft geared to the lens system of the camera and driven by the first mentioned gearing for effecting movement of the lens system of the camera automatically to focus the camera as the camera and its support are moved in any direction which varies the distance between the camera and the plane of a subject to be photographed.

7. Photographic apparatus comprising in combination a camera, a camera support, means including a wheel carried by said support and adapted to rest upon the ground or other supporting surface and rotatable on a horizontal axis and comprising rollers carried at the periphery of said wheel and rotatable about axes at right angles to the axis of said wheel, a gear carried by said wheel, a telescopic shaft rotatable by said gear, a rack adapted to be connected to the lens system of the camera, and a connection between said rack and said telescopic shaft so that as said wheel is rotated by movement of the camera support in any direction which varies the distance between the camera and the plane of a subject to be photographed the lens system of the camera will be automatically focused.

8. In combination, a rack for attachment to a camera lens system, a gear train connected thereto, a camera support, and means carried by said support, which when the camera support is moved in a direction to vary the distance between the support and the plane of a subject to be photographed will impart motion to said gearing to shift the rack in accordance with the variation in distance.

9. In combination, a rack for attachment to a camera lens system, a drum provided on its periphery with a helicoidal groove, said rack engaging said groove so that rotation of the drum will impart movement to said rack in accordance with the shape of said groove, a camera support, a planimeter wheel and a drive train intermediate said wheel and drum to rotate the drum as the camera support is moved in a direction to vary the distance between it and the plane of a subject to be photographed.

LORENZO DEL RICCIO.